Nov. 2, 1937. R. E. SNYDER 2,097,537

REMOTELY CONTROLLED SPOTLIGHT

Filed June 7, 1933 8 Sheets-Sheet 1

INVENTOR
R. E. SNYDER
By Hazard & Miller
ATTORNEYS

Nov. 2, 1937.  R. E. SNYDER  2,097,537
REMOTELY CONTROLLED SPOTLIGHT
Filed June 7, 1933  8 Sheets-Sheet 2

INVENTOR
R. E. SNYDER
By Hazard & Miller
ATTORNEYS

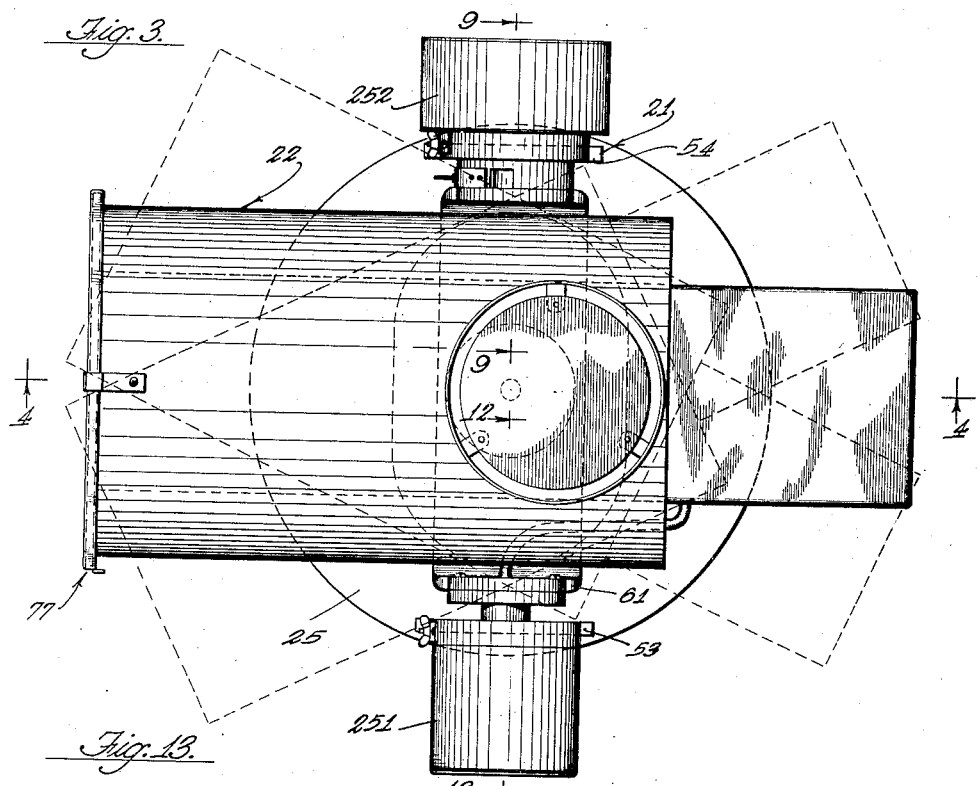
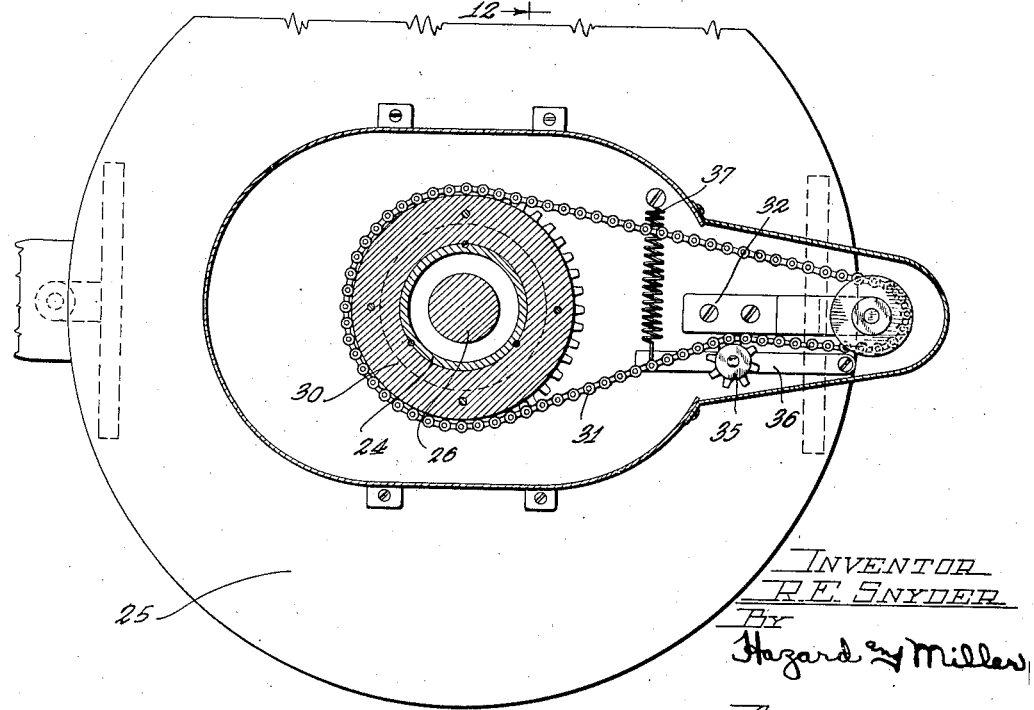

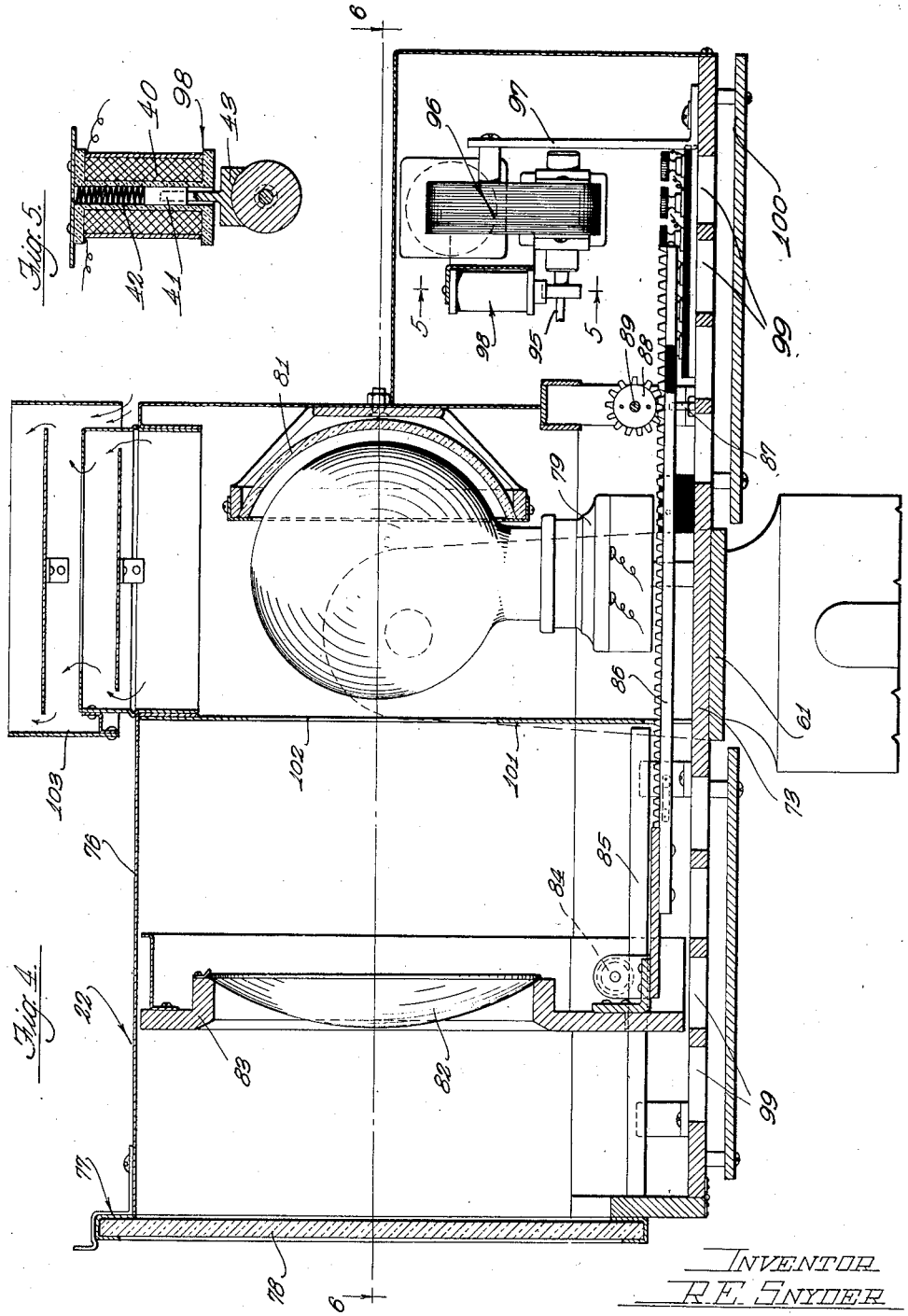

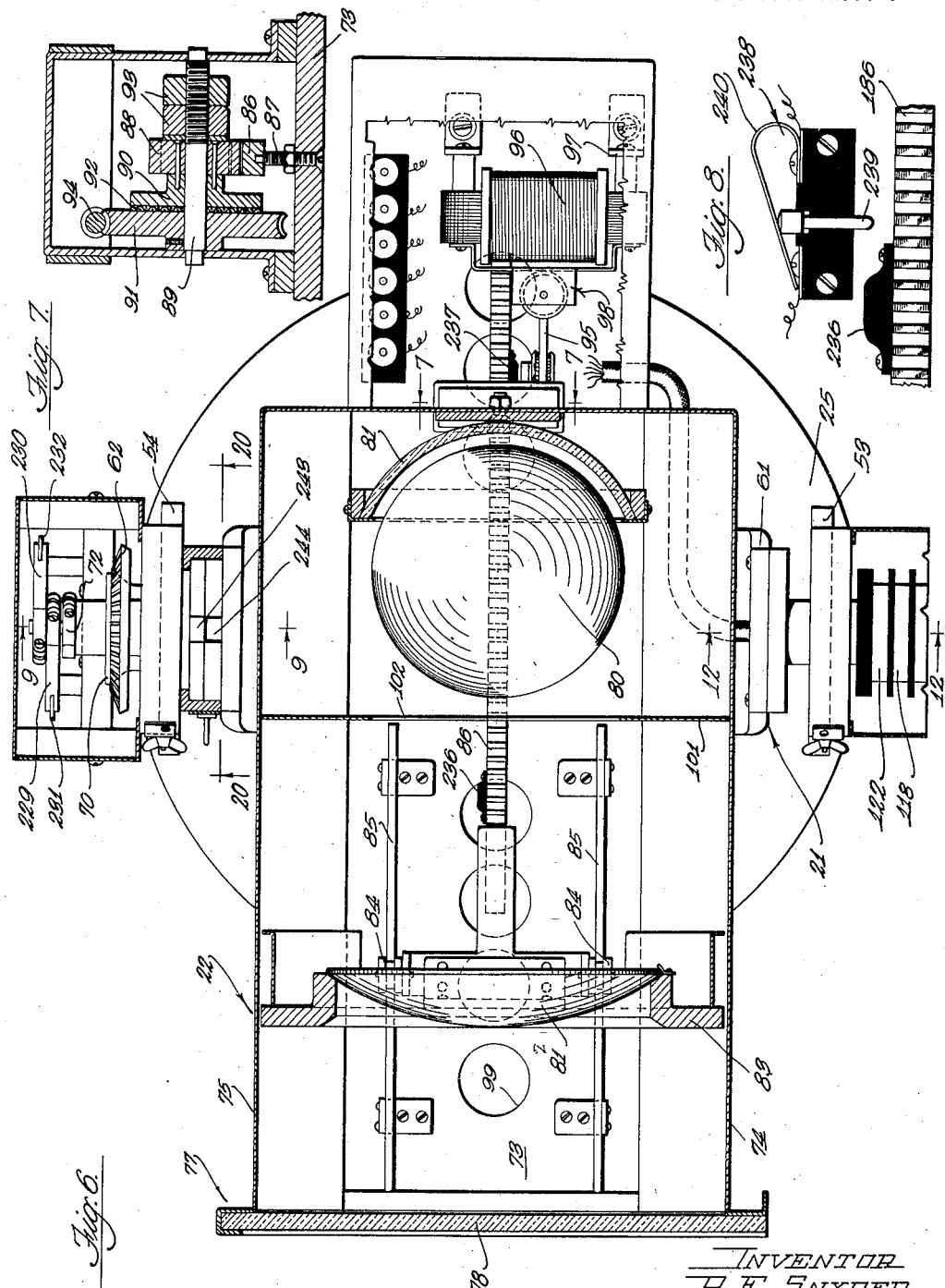

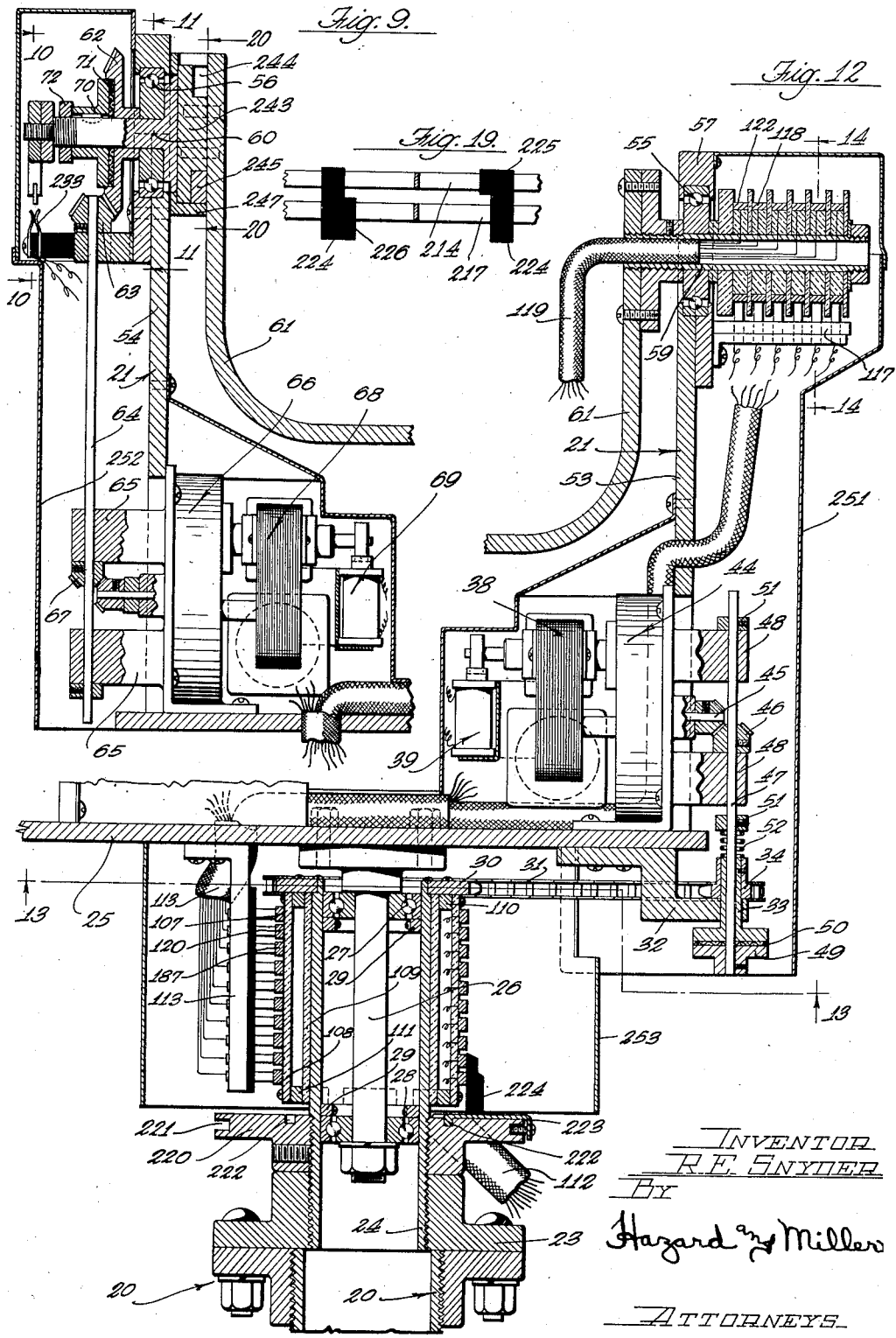

Nov. 2, 1937.   R. E. SNYDER   2,097,537
REMOTELY CONTROLLED SPOTLIGHT
Filed June 7, 1933   8 Sheets-Sheet 7
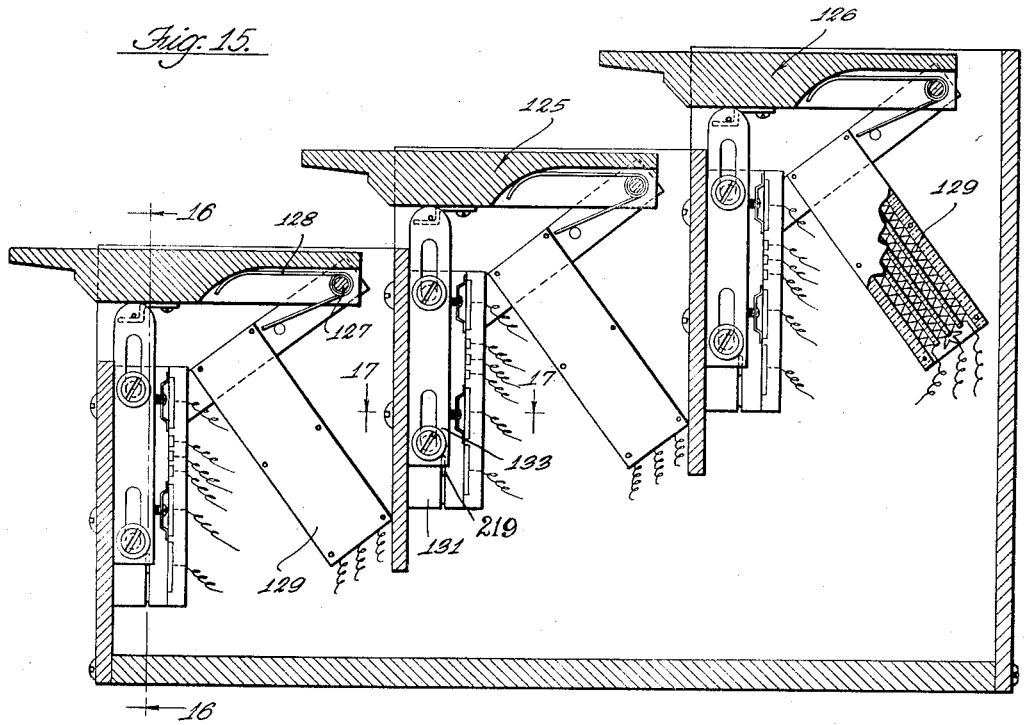
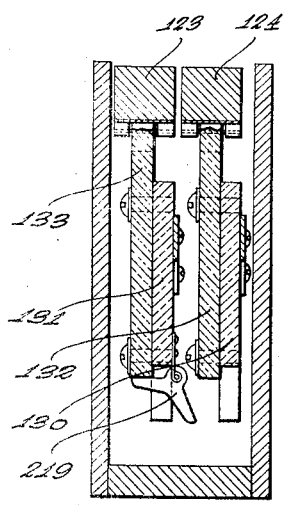
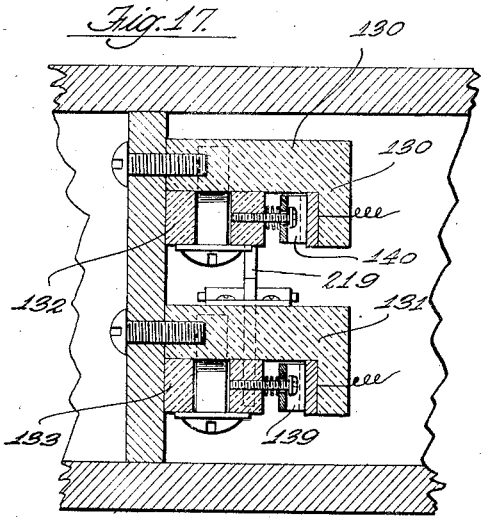
INVENTOR
R. E. SNYDER
By Hazard & Miller
ATTORNEYS Nov. 2, 1937.         R. E. SNYDER         2,097,537
REMOTELY CONTROLLED SPOTLIGHT
Filed June 7, 1933         8 Sheets-Sheet 8
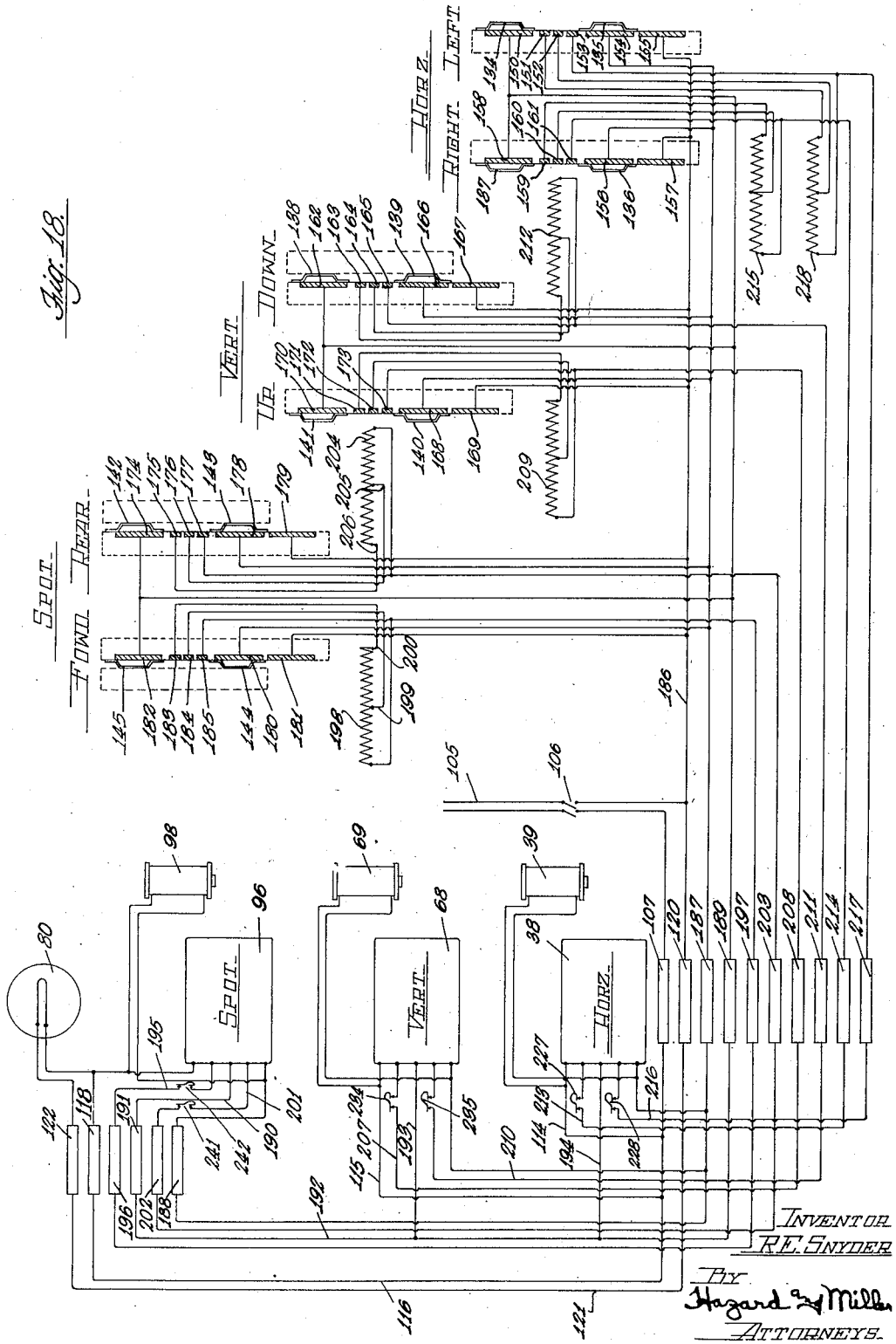

Patented Nov. 2, 1937

2,097,537

UNITED STATES PATENT OFFICE 2,097,537

REMOTELY CONTROLLED SPOTLIGHT

Robert Earl Snyder, Pasadena, Calif., assignor of one-half to Fred L. Harter, Los Angeles, Calif.

Application June 7, 1933, Serial No. 674,642

13 Claims. (Cl. 240—3)

This invention relates to improvements in spotlights and particularly to spotlights which are remotely controlled. The invention has been primarily designed for use in connection with stage work for throwing an area of light onto the stage. It may be used, however, for throwing or projecting any form of radiant energy from a suitable source, for example ultra-violet rays which are sometimes used in stage work to bring out certain effects. Insofar as the present invention is concerned, it may be used with any other source of radiant energy.

The present invention has for one of its objects to provide an improved remotely controlled spotlight designed to be suitably mounted at any suitable location for throwing an area of light onto a stage or object. The improved construction has several adjustments in that the lantern of the construction may be moved about vertical and horizontal axes. A further adjustment is provided between the focus means of the lantern and the source of radiant energy, such as an incandescent lamp, carbon arc, or other source of radiant energy, to vary the size of the area of light thrown. Remotely controlled means is employed for accomplishing movements of the lantern and for adjusting the distance between the lamp and focusing means. This remotely controlled means for example may be located in the orchestra pit so that the operator, who may be immediately in front of the stage, may easily and quickly bring about adjustment of the spotlights to cause them to follow the action on the stage.

More specifically an object of the invention is to provide a spotlight, wherein there is a standard and a lantern mounted on the standard for pivotal movement about horizontal and vertical axes, employing in the construction which accomplishes the movement a friction drive. The purpose of the friction drive is to enable the lantern to slip in the event that during its movements it should foul against some adjacent object. In this way the operating mechanism will not be damaged even though the lantern should foul. The construction also enables manual operation of the spotlight if occasion requires.

Another object of the invention is to provide a construction having the above mentioned characteristics wherein there is a braking means for braking the movement of the lantern when the drive means is no longer energized and which will serve to lock or hold the lantern stationary in any adjusted position in which it may be desired to leave it by discontinuing the energizing of the drive means.

Another object of the invention is to provide a construction of lantern wherein the lens of the lantern is adjusted back and forth with respect to the stationary light source. This enables a very simple construction and enables a design which will prevent the lens from becoming heated by conduction from the light source. It also enables a design for properly ventilating or creating a draft through the lantern to remove heated air therein.

A further object of the invention in connection with the adjustment of the lens with respect to the light, which is utilized to vary the size of the spot of light projected, is to provide a construction employing a friction drive and also a braking means. The friction drive will enable the drive to slip in the event that the lens has become fouled, such as by binding or for any other reason, and the brake means is employed to hold the lens in adjusted position whenever it is not undergoing movement or adjustment.

A further object of the invention is to provide automatic stops, which are adjustable, to limit the movements of the lantern about its vertical and horizontal axes of rotation and to limit the adjustment of the lens. These stops are designed to automatically discontinue the energizing of the drive means when these movable parts approach the ends of their intended movements.

Still another object of the invention is to provide a construction of such a design as to enable the lantern to be reversibly mounted on its standard. Spotlights used for stage work are frequently mounted on upright standards, in which case the lantern is mounted at the top of the standard. Very frequently, however, it is desired to suspend the lantern, in which case the standard is secured to a batten rail or spot tree in inverted position. Under these circumstances it is desirable to be able to reverse the position of the lantern so that the lantern itself will remain upright and cause the ventilating draft to continue therethrough in the manner for which the structure has been designed.

Another object of the invention is to provide a novel remote control means having variable resistances which enable the movable parts of the construction to be driven at various speeds.

More specifically an object is also to so design the remote control means that circuits cannot be accidentally closed which would tend to drive the construction in two opposed directions simultaneously.

With the foregoing and other objects in view, which will be made manifest in the following detailed description, and specifically pointed out in the appended claims, reference is had to the accompanying drawings for an illustrative embodiment of the invention, wherein:

Fig. 3 is a top plan view of the improved spotlight.

Fig. 4 is a vertical section taken substantially upon the line 4—4 upon Figure 3.

Fig. 5 is a vertical section taken substantially upon the line 5—5 upon Figure 4 to illustrate the details of construction of one of the braking means.

Fig. 6 is a horizontal section taken substantially upon the line 6—6 upon Figure 4.

Fig. 7 is a vertical section taken substantially upon the line 7—7 upon Figure 6 to illustrate the details of construction of the friction drive utilized in the adjustment of the lens of the lantern.

Fig. 8 is a partial view in plan illustrating the automatic stop construction employed for automatically stopping movement of the lens when the lens approaches the end of its intended movement.

Fig. 9 is a partial vertical section taken substantially upon the line 9—9 upon Figure 6.

Fig. 12 is a partial view in vertical section, the upper portion of which is taken upon the line 12—12 upon Figure 6. The lower portion of this figure is a diametrical vertical section through the saddle which supports the lantern, illustrating its connection with the standard.

Fig. 13 is a horizontal section taken upon the line 13—13 upon Figure 12 in the direction indicated.

Fig. 15 is a sectional view through the remote control means which operates the improved spotlight.

Fig. 16 is a vertical section taken substantially upon the line 16—16 upon Figure 15.

Fig. 17 is a horizontal section taken substantially upon the line 17—17 upon Figure 15.

Fig. 18 is a wiring diagram of the circuits preferably employed in the improved spotlight, illustrating its manner of control by the remote control means.

Fig. 19 is a diagrammatic view illustrating a detail of construction.

Figure 1:
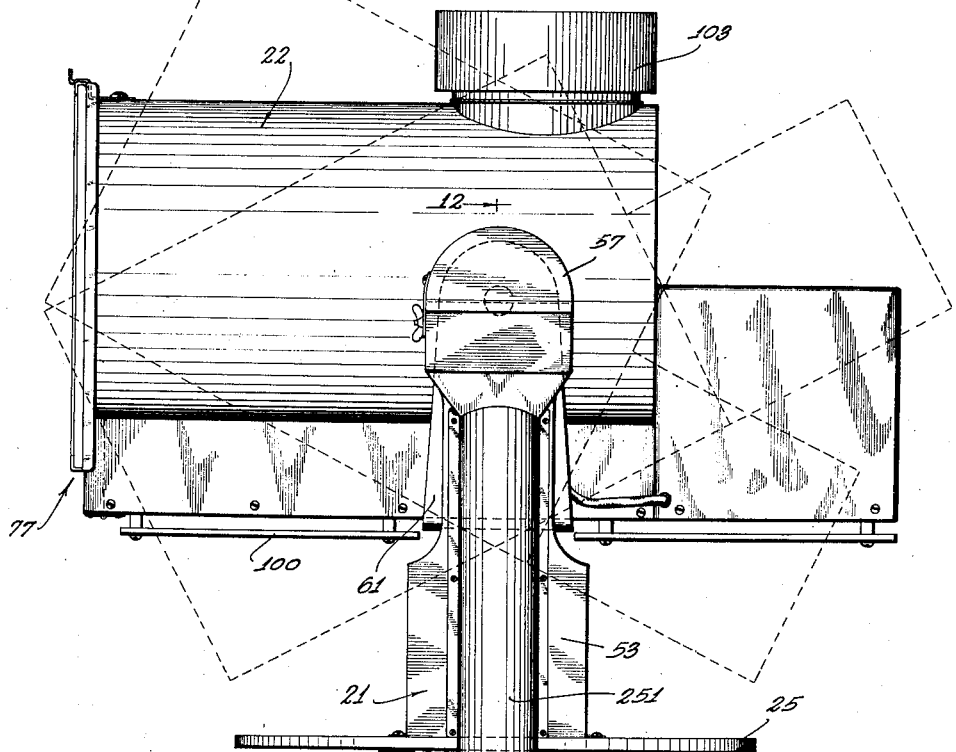
Fig. 1 is a view in side elevation of the improved remote controlled spotlight.
Figure 10:
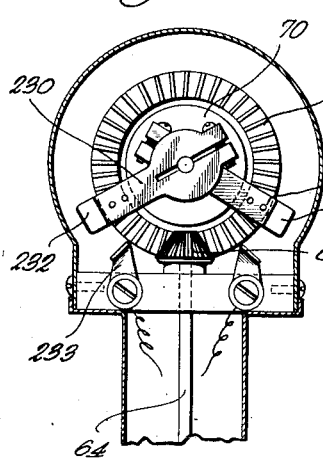
Fig. 10 is a vertical section taken substantially upon the line 10—10 upon Figure 9 illustrating the details of the automatic stop construction utilized to automatically stop rotation of the lantern about its horizontal axis.

Referring to the accompanying drawings, wherein similar reference characters designate similar parts throughout, the improved spotlight is mounted on a suitable standard 20, which in the conventional theatre practice is merely a section of pipe or tubing. On top of this standard there is rotatably mounted a saddle generally designated at 21. This saddle is rotatable about a vertical axis with respect to the standard. The lantern, which is generally designated at 22, is rotatably mounted in the saddle for rotation about a horizontal axis so that it may assume positions with respect thereto, such as are indicated by dotted lines on Figure 1.

The details of construction of the connection between the saddle and the standard are as follows. A flanged coupling 23 is used to fasten a nipple 24 rigidly to the top of the standard. The saddle has a base 25 on the under side of which is secured a central pintle 26. This pintle extends through antifriction bearings 27 and 28 which are fastened in place by means of rings 29 on the interior of the nipple. This construction enables the saddle to turn freely about a vertical axis with respect to the stationary standard 20. As a means for accomplishing rotation of the saddle with respect to the standard, the upper end of nipple 24 has rigidly secured thereto a sprocket 30 around which is trained an endless chain 31. At one side of the base 25 of the saddle there is secured a small arm 32 through which extends a rotatable sleeve 33. A small sprocket or pinion 34 is rigidly fastened to the sleeve and chain 31 is trained over this small sprocket or pinion. An idler or take-up sprocket or pinion 35 is mounted on the lever 36 on the under side of base 25 and is urged against the chain 31 by means of a spring 37. This keeps the chain taut at all times. It is apparent that on rotating the small sprocket or pinion 34 in either direction that it will cause the saddle to rotate about the stationary standard and about the large sprocket 30 which is rigid therewith.

The drive means for accomplishing rotation of the saddle with respect to the standard consists of a small electric motor 38. Associated with the rotor shaft of this motor there is a solenoid brake 39 the details of which are illustrated in Figure 5. This brake consists merely of a solenoid 40 having an armature 41 urged by means of a spring 42 toward the rotor shaft. A small shoe 43 is fastened to armature or core 41 so as to be moved into engagement with the brake drum on the rotor shaft by the spring when the solenoid is not energized, or to be withdrawn from engagement with the drum against the action of the spring whenever the solenoid is energized. The details of construction of the motor 38, of the solenoid brake 39, and their connections with each other, will hereinafter be described. However, it should be mentioned that the connection is such that when the motor is not being driven the brake is holding the rotor shaft stationary by the spring 42 forcing shoe 43 into engagement therewith. The reference character 44 designates a reduction gear box which is mounted on the saddle and which is driven by motor 38. The take-off from this reduction gear box is indicated at 45. Miter gears 46 connect the take-off from the reduction gear box with a vertical shaft 47 mounted for rotation in supports 48. This shaft extends down through sleeve 33 and is provided at its bottom with a flanged collar 49. Between the flange of collar 49 and the flange on sleeve 33 there may be a friction facing provided by a layer of fabric 50. Collars 51 hold shaft 48 against longitudinal movement and a coil spring 52 is compressed between the lower collar 51 and the end of sleeve 33, urging the sleeve downwardly into engagement with the fabric 50. This fabric between the flanges forms a friction clutch or drive between motor 38 and pinion 34. Consequently when motor 38 is being driven, the saddle is caused to rotate on the standard. However, in the event that the saddle or the lantern thereon should foul it is apparent that the friction drive established by the frictional engagement between flanges on sleeve 33 and collar 49 will enable slippage to take place so that while the motor continues to run the spotlight will not continue to turn against the fouling object, resulting in ultimate destruction of the device. Also this construction of a friction drive enables the saddle and the lantern thereon to be manually turned even though the brake 39 is holding the rotor shaft stationary. It is apparent by merely overcoming the friction of the friction drive that the structure can be manually turned with respect to the stationary standard.

Figure 11:
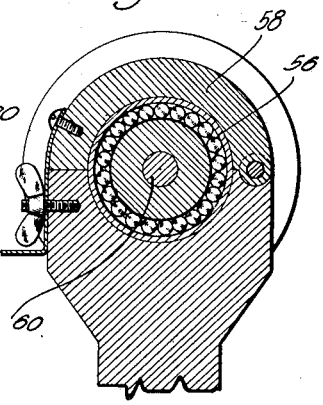
Fig. 11 is a vertical section taken substantially upon the line 11—11 upon Figure 9 illustrating the details of construction of the split bearing holder forming a part of the saddle that pivotally mounts the lantern for rotation about its horizontal axis.
Figure 2:
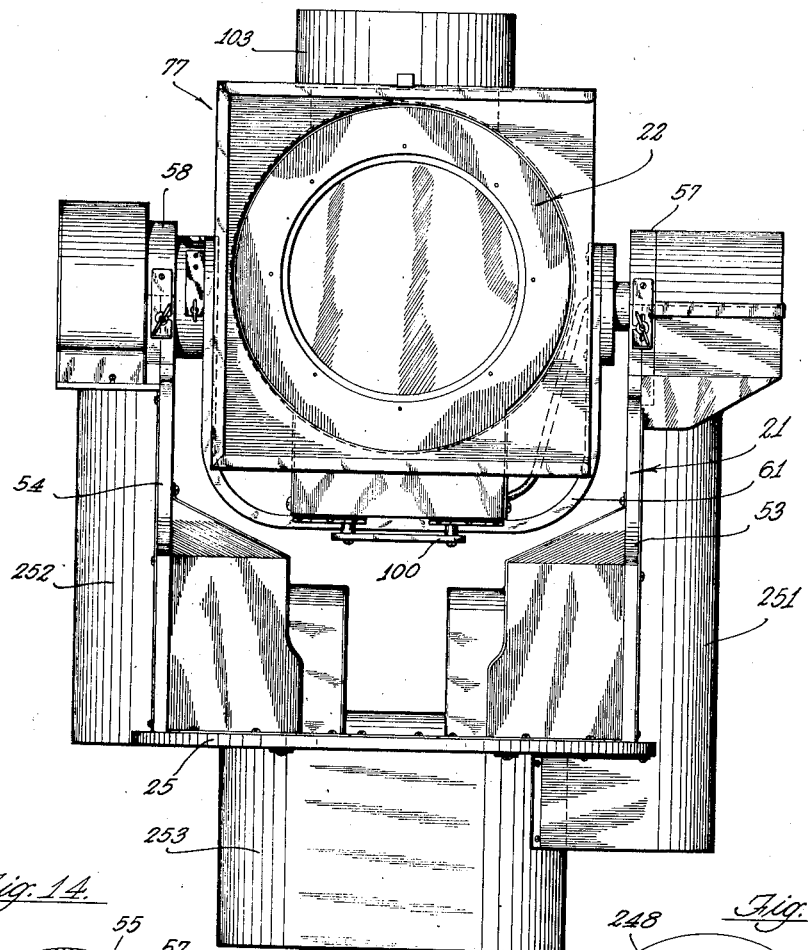
Fig. 2 is a view in front elevation of the same.
Figure 14:
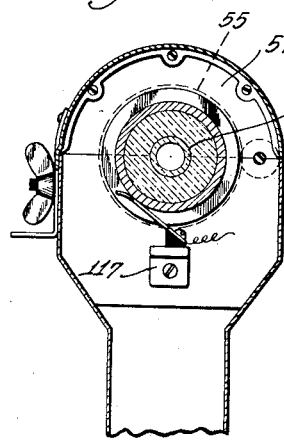
Fig. 14 is a vertical section taken substantially upon the line 14—14 upon Figure 12.

Saddle 21 has upstanding sides 53 and 54, which sides have at their tops bearing holders for bearings 55 and 56. These bearing holders have hinged caps 57 and 58, see Figs. 14 and 11. Within the bearings there are rotatable spindles, the spindle for bearing 55 being hollow and indicated by the reference character 59. The opposite spindle, which may be solid, is indicated by the reference character 60. The two spindles support at their inner ends a U-shaped stirrup member 61 within which the lantern is disposed. Spindle 60 has loose thereon a miter gear 62, which meshes with a miter pinion 63 on a vertical shaft 64 mounted for rotation in arm 65. This vertical shaft is driven off of a reduction gear box 66 mounted on the saddle by means of meshing miter gears 67. The reduction gear box 66 is driven by an electric motor 68 similar in construction to motor 38 and having associated therewith an electric brake 69 similar to electric brake 39. A flanged sleeve 70 is keyed on spindle 60 opposite the body of miter gear 62 and an intervening layer of fabric 71 may form a friction drive between the flanged sleeve and the miter gear. The flanged sleeve is urged into engagement with fabric 71 by means of a nut 72 threaded onto the spindle. This construction of flanged sleeve 70, fabric 71, and miter gear 62, forms a friction drive between motor 68 and stirrup 61 so that in normal operation whenever motor 68 is running the stirrup 61 will be rotated about its horizontal axis on spindles 60 and 59. However, if the lantern should foul, the friction drive will permit slippage to take place and the friction drive also enables the lantern to be manually moved either while the motor is being driven or while its rotor shaft is held stationary by electric brake 69, it being merely necessary in such manual operation to overcome the friction of the friction drive.

Referring now to Figs. 4, 6 and 7, illustrating the construction of the lantern, the lantern consists of a base 73 which is mounted on stirrup 61. On the base 73 of the lantern there is mounted a housing having side walls 74 and 75 and a top wall 76. At the forward side of the housing there is mounted a suitable frame generally designated at 77 to receive various holders or plates 78 for making color changes. This frame may be similar to the conventional frame used for making color changes in spotlights. On the interior of the housing forming the body of the lantern there is stationarily mounted a socket 79 on which an electric lamp 80 may be mounted. This lamp constitutes the light source of the lantern and may be of any preferred construction. If desired an arc light may be substituted therefor, or any other suitable construction operating as a source of radiant energy may be used. Behind the lamp 80 there is preferably mounted a reflector 81. Forwardly of the lamp there is a lens 82 mounted within a lens frame 83 which is movable back and forth in the housing. This movable lens is illustrative of any one of a number of different focusing systems that might be employed, which may or may not be complex. If a stationary condenser lens, not shown, is used in conjunction with the movable focusing lens, this may be regarded as part of the focusing system. This lens frame is supported by means of rollers 84 movable on rails 85 which are mounted on the base 73. A rack 86 extends rearwardly from the lens frame adjacent the center of the base and has its rear end slide on a stud 87 mounted on the base 73 and having a pin fitting in the groove on the under side of the rack, as clearly shown in Figure 7. A spur gear 88 meshes with the rack and is rotatable on a stationary transverse shaft 89. This spur gear is pinned to a flanged collar 90 disposed adjacent a worm wheel 91. The fabric 92 between the flanged collar and the worm wheel forms a friction drive between the worm wheel 91 and collar. The collar is urged into engagement with the worm wheel by tightening or adjusting nuts 93. The worm wheel is driven by means of a worm 94 on a longitudinally running shaft 95 which may be an extension or continuation of the rotor shaft of electric motor 96 mounted on standards 97 and having associated therewith an electric brake 98. In this construction the worm 94 and worm wheel 91 form a sufficient reduction of speed that a reduction gear box is not necessary. In this construction, however, it will be noted that when motor 96 is being driven that spur gear 88 will be slowly rotated, causing the rack 86 to move the lens frame 83 either forwardly or rearwardly depending upon the direction of rotation of motor 96. Movement of lens frame 83 adjusts lens 82 with respect to the stationary light source 80. Movement of the lens relatively to the light is preferred in that quite a number of advantages are possible in the design of the lantern to eliminate heat and keep the heat generated at the light source away from lens 82. Also being able to move the lens with respect to the light source permits of the creation of a greater illuminated area when the lantern is adjusted to throw the largest spot of light onto the stage. The design is such that inasmuch as the light source or the source of radiant energy is stationary with respect to the body of the lantern, that no movable wires or electrical connections are required in supplying electrical current to the light source. In this construction the friction drive is used so as to enable the motor and its connected worm wheel 91 to slip in the event that lens frame 83 has in some way become fouled or should tend to bind. In this way, by allowing slippage to take place, the device will not destroy itself. The brake 98 serves to hold the lens 82 in any adjusted position when the motor 96 is not moving it.

As a means for ventilating and carrying off the heat, the base 73 is apertured as indicated at 99, these apertures being located both in front and in back of stirrup 61. The apertures have baffles 100 beneath them preventing the direct escape of light from the lantern except through the lens. Between the light source and the lens there is an apertured plate 101, the size of the aperture 102 therein being sufficient to enable all the light thrown forwardly to pass therethrough and through lens 82. The aperture 102 is carefully designed so as to shield off all other light emanating from the light source and which would not be thrown directly through lens 82. In this way lens 83 will not become heated by convection nor will heat be transmitted to the lens by conduction. Immediately above the lamp 80 there is telescopically mounted a baffled chimney 103. This enables air, which is heated by the lamp 80, to rise vertically therethrough without the escape of light through the top of the lantern and the arrangement is such as to cause a draft to rise adjacent the sides of the lamp 80. In other words cold air enters the lantern through apertures 99 and sweeps therethrough toward the lamp, tending to keep the lamp cool and confine the heat of the lamp adjacent the center of the lantern. The draft is also such as to draw heated air away from the rear motor housing. The heated air rises through the chimney and escapes.

In the construction as above described it will be appreciated that provision is made for rotating the saddle and lantern about a vertical axis. The lantern may rotate in the stirrup with respect to the saddle about a horizontal axis and the lens 82 may be adjusted toward or away from the light source to vary the size of the area of light projected on the stage or object.

The electric circuits for the various motors and electric brakes will now be described. The source of electric current may be from any suitable supply, such as 110 volt line, indicated at 105, see Figure 18. This source of supply is controlled by a master switch 106. One side of the incoming line is connected to a commutator ring 107. This commutator ring is shown in Figure 12 as being mounted on a cylindrical section of insulation 108 which is spaced from an inner section of insulation 109 surrounding nipple 24 by means of spacers 110 and 111. The lower spacer is segmental in form, as indicated by dotted lines on Figure 12, so that the wires of the cable 112 may pass through the spaces between the segments and be connected through section of insulation 109 to their various commutator rings. Current is taken off of commutator ring 107 by means of a brush on a brush holder 113 which is mounted on the under side of base 25. There are similar brushes mounted on this brush holder which engage each of the adjacent commutator rings. It is contemplated that alternating current be used and when such is the case the motors 38, 68 and 96, are preferably but not necessarily of the alternating induction type motor having shaded poles by which it is possible to reverse the direction of rotation of the rotor on closing the circuit of the proper shading winding. Commutator ring 107 is connected to parallel or divided circuits. One wire 114 is connected to one side of the stator of motor 38. Another wire, leading from commutator ring 107, indicated at 115, is connected to one side of the stator of motor 68. A third wire 116 leads to a brush on brush holder 117, see Figure 12, which is mounted on the upstanding arm or standard 53 of the saddle. The brushes of the brush holder 117 engage commutator rings of a commutator which is mounted on tubular spindle 59. The particular commutator ring to which wire 116 is connected is indicated by the reference character 118. From this commutator ring a cable 119 leads to lamp 80 and also to one side of the stator of motor 96. The second wire from the source of current supply indicated at 105 leads to divided circuits, one side leading through cable 112 to commutator ring 120 which is mounted adjacent commutator ring 107, see Figure 12. From this commutator ring current is supplied through wire 121 to commutator ring 122 on tubular spindle 59. This commutator ring is connected through cable 119 to the other terminal of lamp 80. It will thus be apparent that whenever master switch 106 is closed that lamp 80 will be immediately energized. The other side of the divided circuit coming from the second wire of master switch 106 is again divided and leads to the control mechanism.

The details of the control mechanism will now be described. The control mechanism, which may be located remotely from the spotlight itself such as in the orchestra pit of the theatre, consists of a bank or set of pairs of keys as shown in Figures 15, 16 and 17. There will be six keys for each spotlight and enough banks or sets of keys for each spotlight used. The lower pair of keys indicated at 123 and 124 are arranged side by side and serve to control the direction of rotation and the speed of rotation of motor 38, which produces the horizontal rotation of the spotlight about its vertical axis. In other words depressing key 123 is designed to cause motor 38 to rotate in one direction, while depressing key 124 is designed to cause motor 38 to rotate in the opposite direction. A similar pair of keys, designated at 125, controls the direction of rotation of motor 68 which accomplishes rotation of the lantern with respect to the saddle vertically or about its horizontal axis. Depressing one key of this pair causes motor 68 to rotate in one direction and depressing the adjacent key causes it to rotate in the opposite direction. The third pair of keys indicated at 126 controls motor 96, that is by depressing one of these keys lens 82 will be moved toward the light source 80 and depressing the adjacent key causes lens 82 to move in the opposite direction. The respective pairs of keys are pivoted on pintles 127 and are urged into their uppermost positions by means of springs 128. Beneath each pair of keys there are suitable resistances enclosed within resistance boxes 129 and various leads are connected with these resistances to enable the resistances to be partially cut in or cut out, thus forming a variable resistance. Beneath each key there is an angular section of insulation, two of which are indicated at 130 and 131 on Figure 17. A brush carrier is secured to the under side of each key, the two brush carriers shown on Figure 17 being indicated by the reference characters 132 and 133. These brush carriers have pin and slot connections with their respective sections of insulation 130 and 131 enabling the brush carriers to slide with respect to the sections of insulation when the keys are depressed. Each brush carrier carries two brushes and for purposes of clarity the various brushes have been separately identified for each key on Figure 18 by the reference characters 134, 135, 136, 137, 138, 139, 140, 141, 142, 143, 144 and 145. On the angular sections of insulation 130 and 131 beneath their respective keys there are secured contacts which are wiped by the various brushes. Referring specifically to Figure 18, brush 134 will wipe on contacts 150, 151, 152 and 153. Brush 135 will wipe on contacts 154 and 155. Similarly for the adjacent key of the lowermost pair brush 136 will wipe on contacts 156 and 157. Brush 137 will wipe on contacts 158, 159, 160 and 161. Brush 138 will wipe on contacts 162, 163, 164 and 165. Brush 139 engages contacts 166 and 167. Brush 140 is engageable with contacts 168 and 169. Brush 141 is engageable with contacts 170, 171, 172 and 173. Brush 142 engages contacts 174, 175, 176 and 177. Brush 143 engages contacts 178 and 179. Brush 144 engages contacts 180 and 181. Brush 145 is engageable with contacts 182, 183, 184 and 185.

The second wire 186 leading from switch 106 is connected to contacts 181, 179, 169, 167, 157 and 155. When the left hand key of any of the pairs of keys is depressed brushes 144, 140, or 136, will be moved downwardly from the position shown in Figure 18 to establish contact between contacts 181 and 180, or 169 and 168, or 157 and 156, as the case may be. In a similar manner on depressing the upper right hand key of the uppermost pair 126 causes brush 143 to establish contact between contacts 179 and 178. If the right hand key of pair 125 is depressed, brush 139 connects contacts 167 and 166. Likewise depressing key 124 causes brush 135 to connect contacts 155 and 154. Contact 180 is connected to commutator ring 187 which is immediately below commutator ring 120, see Figure 12. Contacts 178, 168, 166, 156 and 154, are also connected to this same commutator ring. Commutator ring 187 is connected to the opposite side of stator of motor 38 and to the opposite sides of the stators of motors 68 and 96, the connection between commutator ring 187 and stator of motor 96 being through commutator ring 188 mounted on tubular spindle 59, see Figure 18. In this way it will be noted that whenever any key is depressed the very first connection made is to close the circuits through the stators of all three motors. Inasmuch as the solenoid of electric brake 39, the solenoid of electric brake 69, and the solenoid of electric brake 98, are all shunted across the leads to the stators of their respective motors, the closing of the circuits through the stators simultaneously energizes the solenoids of the brakes, causing the brakes to release. Whenever the circuits through the stators are broken, then the brake shoes of the respective brakes are urged into engagement with the brake drums of their respective motors by their respective springs. However, whenever the circuits through the stators are closed, causing the electric brakes to release, it does not necessarily follow that the saddle, the lantern, or the lens, are free to move. In a reversible reduction motor of the shaded pole type when the shaded windings are left open circuit and the stator is energized, the alternating magnetic flux created by the stator in the rotor serves to magnetically hold the rotor stationary until the shading coil circuit is closed. Also when the motor has been running and the shading coil circuit is opened, the magnetic flux is sufficient to stop rotation of the rotor very quickly even though the brake may be held disengaged. Consequently the mere closing of the circuits of the stators, which also involves release of the magnetic brakes, still keeps the construction effectively braked by the action of the motor itself until the shading coil circuit is closed. It is because of this advantage that a shaded coil induction motor is preferably used but the advantage may be dispensed with and other types of motors used if desired. The space between contacts 182 and 183 is slightly greater than the space between contacts 180 and 181 so that although brushes 145 and 144 will be moved downwardly simultaneously on depressing the left hand key of the upper pair 126, connection is established between contacts 180 and 181 before a connection is established between contacts 182 and 183. In a similar manner depressing the right hand key of pair 126 causes brush 143 to connect contacts 179 and 178 slightly prior to the connecting of contacts 175 and 174 by brush 142. Similarly brush 140 will connect contacts 168 and 169 shortly before contacts 170 and 171 are connected. Also brush 139 will connect contacts 166 and 167 before brush 138 connects contacts 162 and 163. Also brushes 136 and 135 will connect contacts 156 and 157 and contacts 154 and 155 respectively before their respective associated brushes 137 and 134 connect contacts 158 and 159 and 150 and 151 respectively. This arrangement is designed to enable closing of the motor stator circuits which necessarily involves a release of the magnetic brakes and the utilization of the motor itself to hold the structure effectively braked slightly in advance of the closing of any shading coil circuit.

The motors each having two shading coils rendering them reversible, one side of each shading coil circuit is connected to commutator ring 189, thus the common wire for the two shading coil circuits of motor 96 is indicated at 190 and leads through commutator ring 191 on hollow spindle 59. To the same wire 192 leading therefrom, the common wire for shading coil circuits of motor 68 is connected by means of wire 193. Likewise the common wire for shading coil circuits of motor 38, as indicated at 194, is connected; so that the three wires 190, 193 and 194, are all connected to commutator ring 189. Commutator ring 189 is connected to each of contacts 182, 174, 170, 162, 158 and 150. The left hand shading coil circuit for motor 96 is connected by means of wire 195 through commutator ring 196 on tubular spindle 59 to commutator ring 197 and this in turn is connected to one side of resistance 198 and also to contact 185. A lead 199 leads from about the middle of the resistance to contact 184 while a third lead 200 leading from the opposite end of the resistance is connected to contact 183. Consequently when the left hand key of pair 126 is depressed the first movement is to cause brush 144 to connect contacts 180 and 181, closing the stator circuit of all motors, the release of all magnetic brakes, and the creation of the braking effect by the motor itself, and immediately following this as soon as brush 145 connects contact 182 with contact 183 the left hand shading coil circuit of motor 96 will be closed through the entire resistance 198. This maximum amount of resistance placed in the shading coil circuit creates the minimum amount of shading effect produced by the shading coil with the result that motor 96 rotates under the influence of the left hand shading coil with a minimum speed. A further depression of the left hand key disconnects contact 183 from contact 182 and connects contact 184 with contact 182 with the result that half of the resistance of resistance 198 is cut out. This increases the current of the shading coil circuit with the result that there is a greater shading and motor 96 will rotate under the influence of the left hand shading coil circuit with greater speed. A further depression of the left hand key of pair 126 connects contact 185 with contact 182, cutting out all resistance 198, with the result that motor 96 rotates with the maximum speed. In a similar manner the right hand shading coil lead is connected through wire 201, through commutator ring 202 on tubular spindle 59 to commutator ring 203. This in turn is connected to the outermost lead of resistance 204 and to contact 177. Leads 205 and 206 connect resistance 204 with contacts 176 and 175 respectively, with the result that on depressing the right hand key of pair 126 the stator circuits of all motors are first closed, resulting in the release of all brakes and on continued depression connection of contact 174 with contact 175 places a maximum resistance in the right hand shading coil circuit with the result that motor 96 rotates under the influence of the right hand shading coil in an opposite direction to that previously mentioned and with a minimum speed. Further depression of the key cuts out resistance 204 until when the key is fully depressed resistance 204 is fully cut out and motor 96 is rotating under the influence of the right hand shading coil with maximum speed. In a similar manner to that above described, the left hand shading coil circuit of motor 68 is connected through wire 207 to commutator ring 208, which in turn is connected to contact 173 and through resistance 209 to contacts 172 and 171. The right hand shading coil of motor 68 is similarly connected through wire 210 to commutator ring 211 to contact 165 and through resistance 212 to contacts 164 and 163. In a similar manner the left hand shading coil of motor 38 is connected through wire 213 to commutator ring 214, which in turn is connected to contact 161 and through resistance 215 to contacts 160 and 159. Likewise the right hand shading coil of motor 38 is connected through wire 216 to commutator ring 217, which in turn is connected to contact 153 and through resistance 218 to contacts 152 and 151.

To make a brief summary of what is accomplished in the improved remote controlled spotlight, it will be noted that closing master switch 106 does nothing in the various circuits except to energize lamp 80 and make the whole system "hot". The first downward movement of any key closes the stator circuits and closes all the brake circuits with the result that the brakes are released but the structure is held stationary by the braking action of the motor itself. The continued downward movement of a key closes one of the shading coil circuits with a maximum resistance therein, with the result that the motor with which the particular key is associated is driven in a direction for which the key is intended with a minimum speed, producing a minimum speed adjustment of the spotlight. A further depression of the key cuts out the resistance in the shading coil circuit and increases the speed of rotation of the motor controlled by the key in question. As a means for preventing two keys of the same pair being simultaneously depressed and thus closing both shading coil circuits of the same motor, pivoted dogs 219 are mounted beneath each pair of brush carrying members 132 and 133, as shown on Figure 16. These dogs are such as to enable any one key of a pair to be depressed but to prevent its adjacent key from being depressed simultaneously therewith. In this way it is impossible to accidentally depress both keys controlling the same motor and thus accidentally closing both shading coil circuits simultaneously.

It is desirable to have an adjustable stop arrangement which will automatically break shading coil circuits when the keys have been inadvertently left depressed too long. In other words it is desirable to have an automatic limiting construction which will limit movement of the spotlight or its adjustment in any manner, when the adjustment of the spotlight has approached a predetermined limit. To this end a flanged collar 220 is mounted on nipple 24 immediately above coupling 23. This collar has a circumferential groove 221 and a surface groove 222. There are two clips 223 which are slidable in these two grooves 221 and 222 so that these clips may be adjusted around the periphery of the flanged collar. Each clip carries an upstanding section of insulation 224. Clips are illustrated in detail in Figure 19. As shown in Figure 19, one of the upstanding sections of insulation 224 has a laterally extending portion 225 adjacent upper commutator ring 214. The opposite section of insulation 224 has a laterally extending portion 226 adjacent commutator ring 217. If brushes 137 and 136 should be held depressed a long period of time, the saddle would rotate relatively to the standard until one of the brushes on brush holder 113 engaged laterally extending portion 225 on the section of insulation 224. This would disconnect this brush from commutator ring 214, thus opening the circuit of the shading coil which is closed by brush 137. In this way the rotation of the saddle would automatically be stopped when it approaches the limit of its movement established by setting clip 223. This openable switch is indicated on Figure 18 by the reference character 227. At the same time that the shading coil circuit is opened in this manner, it will be noted that the brush which engages commutator ring 217 remains in contact with its commutator ring so that the shading coil circuit on the opposite pole of the motor is left closed at this point so as to be capable of being completely closed on depressing brushes 134 and 135 to cause the saddle to rotate in the opposite direction. In the event that it is rotated too far in the opposite direction, the brush which engages commutator ring 217 engages laterally extending portion 226 and is lifted thereby from engagement with commutator ring 217 thus automatically discontinuing further rotation in this direction. This openable switch is indicated on the wiring diagram of Figure 18 by reference character 228.

As a means for limiting rotation of the lantern about the horizontal axis in the saddle, spindle 60 is provided with two rotatably adjustable arms, see Figures 9 and 6. These arms are indicated by the reference characters 229 and 230. At their outer ends they carry small sections of insulation indicated at 231 and 232. The shading coil circuits for motor 68 have two resilient contacts. A pair of resilient contacts for one of the shading coil circuits is indicated by the reference character 233 on Figure 9. A similar pair is provided for the opposite arm. It will be noted that in the position shown wherein the contacts engage each other that the shading coil circuits are closed at these points. However, if the lantern should be rotated vertically or about its horizontal axis beyond the desired amount, one of the sections of insulation 231 or 232 will be caused to enter between the resilient contacts and space them, thus breaking the circuit at this point. These openable switches controlling the two shading coil circuits for motor 68 are indicated on the wiring diagram by the reference characters 234 and 235. In a similar manner in order to prevent excessive rotation of motor 96 which operates the lens frame 83, the rack 86 carries sections of insulation 236 and 237, see Figure 6. In the paths of movement of these sections there are located openable switches generally designated at 238, see Figure 8, having plungers 239. When the rack approaches the end of the movement it is intended to take, the sections of insulation 236 and 237 engage the plungers, lifting the resilient contacts 240 and thus opening the shading coil circuits of motor 96 and discontinuing further rotation of this motor's rotor. These openable switches are indicated on the wiring diagram by the reference characters 241 and 242.

Figure 20:
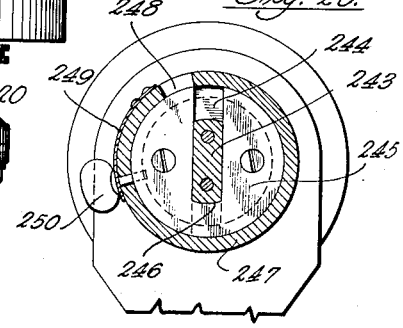
Fig. 20 is a vertical section taken upon the line 20—20 upon Figure 9.

It not infrequently occurs in arranging the spotlights for a stage production that it is desired to suspend the lantern rather than support it, in which case the standard 20 may be suspended from a batten, rail, or spot tree. In so doing, however, it is desirable to invert the lantern within the saddle so that the base will be lowermost and that convection currents of air through the lantern will create the desired draft to take care of the heat. To this end it will be noted that the standards 53 and 54 of the saddle have split bearing holders. By opening bearing holder 57, the bearing 55, spindle 59 and commutator mounted thereon, can be lifted bodily off of the saddle with the U shaped stirrup member 61. It is not desired to disengage gear 62 from miter pinion 63 whenever the position of the lantern is reversed. Consequently the bearing holder 58 is left closed during this operation. A detachable connection is made between the stirrup 61 and spindle 60, see Figures 9 and 20. A T-shaped piece 243 is riveted or otherwise secured to the side of the stirrup 61. This T-shaped piece has its head received in a diametrical slot 244 formed on the inner end of spindle 60. A cover plate 245 is fastened over the end of spindle 60, which cover plate covers the bottom of diametrical slot 244 so that when the T-shaped piece 243 is inserted into the slot through its top it slides downwardly therein until it engages edge 246 on the cover plate. A sleeve 247 is rotatable on the spindle and has an opening 248 therein which can be caused to register with the top of slot 244. In this position removal of the T-shaped piece 243 and detachment of the stirrup from the spindle can be accomplished. This sleeve, however, is used to lock the T-shaped piece 243 in the groove and in this position it is rotated so as to throw aperture 248 out of register with the slot, as shown on Figure 20. The sleeve is held in position by means of a leaf spring 249 carrying a handled pin 250 receivable in an aperture in the end of the spindle 60. By thus detaching the stirrup 61 from spindle 60 at this point and lifting spindle 59 and associated structure out of the opened bearing holder, the entire lantern can be separated from the saddle and turned over end for end and reapplied to the saddle without involving the unmeshing or meshing of miter gears 62 and 63. No adjustment is required on inverting the lantern in the saddle except to readjust the positions of arms 229 and 230. However, inasmuch as all automatic stops should be readjusted with the exception of the stops on rack 86 on every new set up or installation of the spotlight, this adjustment of these arms involved in inverting the lantern is not detrimental. As a protection against dust, dampness, etc., the various operating parts are preferably enclosed within sheet metal covers indicated at 251 and 252 and the commutator at the bottom of the saddle is preferably protected by a suitable shroud 253.

From the above described construction it will be appreciated that a novel advantageous spotlight is provided which may be easily controlled from a remote point. The lantern itself is rotatable about horizontal and vertical axes and adjustment about both of these axes may take place simultaneously or consecutively as desired. Also the shift or change in the size of the area of light thrown may be varied. The keys controlling the various spotlights may be arranged in a manner similar to the console of an organ in the orchestra pit, enabling the operator by merely depressing the proper keys to produce an adjustment of any spotlight he so desires, and enabling the operator to follow the action on the stage very closely. With such an arrangement the master switches 106 for the individual spotlights are also preferably arranged close to the groups of keys. It will be noted that in the improved construction a friction drive is provided for driving the saddle about the stationary standard and that a friction drive is also provided for turning the lantern about its horizontal axis. Also a friction drive is provided for moving the lens frame 83 back and forth. These friction drives take care of the construction in the event that any fouling takes place and also enables the various parts of the improved spotlight to be manually adjusted. Whenever all the keys are released, thus discontinuing the supply of electric energy to the motor stators, the brakes associated with the motors become operative to hold the construction in any adjusted position. This is quite important when it is considered that on the release of the keys it is desired to have the spotlight come to an immediate stop without any overrunning or coasting of the motor. Inasmuch as the brakes operate on the motor shafts themselves rather than between the gear boxes or gear reduction mechanisms and the structures turned or operated, the brakes may be quite small. Their effectiveness, however, is magnified by the mechanical advantage in the gear boxes or reduction mechanisms.

Various changes may be made in the details of construction without departing from the spirit or scope of the invention as defined by the appended claims.

I claim:

1. A remotely controlled projector of radiant energy or the like comprising a standard, a lantern mounted upon the standard for rotation about horizontal and vertical axes, remotely controlled means for causing the lantern to rotate about either or both axes, said means including friction drives enabling the lantern to be manually turned or to stop upon fouling without danger of injury, and friction brake mans for stopping rotation of the lantern and holding the lantern stationary, said friction drive means being located between the brake means and the lantern so that the lantern can be turned manually while the brake means is applied by causing the friction drive means to slip.

2. In a remotely controlled projector of radiant energy, a lantern having a stationary radiant energy source, a movable focus means, remotely controlled means for adjusting the focus means, said means including a friction drive, and brake means for braking movement of the focus means and holding the focus means in adjusted position, said friction drive being located between the brake means and the focus means.

3. In a remotely controlled spotlight or the like having a lantern, light focusing means in the lantern, lantern tilting means and lantern rotating means, remotely located pairs of parallel keys, each key controlling circuits of said means, a variable resistance associated with each key so that the speed of operation may be varied, and means for preventing the keys of each pair from being depressed simultaneously.

4. In a spotlight or the like, a saddle having split bearing holders, a lantern detachably and pivotally mounted upon said saddle whereby the lantern may be turned over in the saddle when the saddle is suspended rather than supported, and a commutator associated with the lantern adjacent one of its pivots in circuit with the light source therein.

5. A projector of radiant energy comprising a standard, a saddle rotatably mounted thereon, commutator rings on the standard, brushes mounted upon the saddle engageable with the commutator rings, a motor on the saddle, a lantern mounted in the saddle, and means including a friction drive driven by the motor and operatively connected with the standard for causing the saddle to rotate about the standard.

6. A projector of radiant energy comprising a standard, a saddle rotatable thereon, a lantern pivotally mounted in the saddle, commutator rings on the standard, brushes on the saddle engageable with the commutator rings, a motor on the saddle, the motor, commutator rings and brushes being in circuit, and means driven by the motor including a friction drive designed to permit of slipping for tilting the lantern relatively to the saddle when the motor is energized.

7. A projector of radiant energy comprising a standard, a saddle on the standard, a lantern pivotally mounted on the saddle, commutator rings on the lantern, brushes on the saddle engageable with the commutator rings, an electric motor on the saddle, means driven by the motor for tilting the lantern relatively to the saddle, a second electric motor in the lantern in circuit with other of the commutator rings and brushes, and means for focusing the radiant energy generated in the lantern operable by said second electric motor.

8. A projector of radiant energy comprising a standard, commutator rings on the standard, a saddle rotatably mounted on the standard, a lantern mounted on the saddle, a motor mounted on the saddle in circuit with the commutator rings, brushes on the saddle engageable with the commutator rings and in circuit with the motor, a sprocket on the standard, a drive shaft on the saddle driven by the motor and located remote from the standard and the axis of rotation of the saddle, a sprocket on the drive shaft, and an endless chain trained over the sprockets whereby upon operation of the motor the saddle will be caused to rotate relatively to the standard.

9. A projector of radiant energy comprising a standard, commutator rings on the standard, a saddle rotatably mounted upon the standard, brushes carried by the saddle engageable with the commutator rings, a motor on the saddle in circuit with some of the brushes and commutator rings on the standard, means driven by the motor for causing the saddle to rotate relatively to the standard, a lantern pivotally mounted upon the saddle, a second series of commutator rings mounted on the lantern, a second set of brushes mounted on the saddle, said second set of brushes being in circuit with brushes of the first set, a second motor mounted on the saddle in circuit with some of the commutator rings on the standard and brushes therefor, and means operatively driven by said second motor for tilting the lantern with respect to the saddle.

10. A projector of radiant energy comprising a standard, commutator rings on the standard, a saddle rotatably mounted upon the standard, brushes carried by the saddle engageable with the commutator rings, a motor on the saddle in circuit with some of the brushes and commutator rings on the standard, means driven by the motor for causing the saddle to rotate relatively to the standard, a lantern pivotally mounted upon the saddle, a second series of commutator rings mounted on the lantern, a second set of brushes mounted on the saddle, said second set of brushes being in circuit with brushes of the first set, a second motor mounted on the saddle in circuit with some of the commutator rings on the standard and brushes therefor, means operatively driven by said second motor for tilting the lantern with respect to the saddle, focusing means for focusing the radiant energy generated in the lantern, a third motor mounted in the lantern, said third motor being in circuit with other commutator rings and brushes of the second sets, and means driven by the third motor for adjusting the focusing means of the lantern.

11. A projector of radiant energy comprising a standard, a saddle rotatably mounted thereon, a lantern carried by the saddle, motor driven means for causing the saddle to rotate about the standard, said motor driven means including a friction drive, and friction brake means in circuit with the motor operable to release the saddle upon energization of the motor and to brake the saddle to slow it down and hold it against rotation when the motor is de-energized, said friction drive being located between the brake means and the saddle.

12. A projector for radiant energy comprising a standard, a saddle rotatably mounted thereon, a lantern pivotally mounted in the saddle, motor driven means for causing the lantern to tilt in the saddle, said motor driven means including a friction drive, and friction brake means in circuit with the motor operable to release the lantern upon energization of the motor and to slow down and brake the lantern and hold it against rotation when the motor is de-energized, said friction driven being located between the brake means and the lantern.

13. A projector of radiant energy comprising a lantern, a stationary source of radiant energy in the lantern, movable focus means on the lantern, motor driven means for adjusting the focus means toward or away from the source of radiant energy, said motor driven means including a friction drive, friction brake means in circuit with the motor operable to release the focus means upon energization of the motor and to brake the focus means and hold it against movement when the motor is de-energized, the friction drive means being located between the brake means and the focus means.

ROBERT E. SNYDER.